(12) United States Patent
Katou et al.

(10) Patent No.: US 8,923,673 B2
(45) Date of Patent: Dec. 30, 2014

(54) OPTICAL MODULATOR

(75) Inventors: Kei Katou, Chiyoda-ku (JP); Shinsuke Kanno, Chiyoda-ku (JP); Ryo Shimizu, Chiyoda-ku (JP); Norikazu Miyazaki, Tokyo (JP); Hideki Ichimei, Chiyoda-ku (JP)

(73) Assignee: Sumitomo Osaka Cement Co., Ltd., Chiyoda-ku, Tokyo (JP)

( * ) Notice: Subject to any disclaimer, the term of this patent is extended or adjusted under 35 U.S.C. 154(b) by 0 days.

(21) Appl. No.: 14/001,059

(22) PCT Filed: Feb. 22, 2012

(86) PCT No.: PCT/JP2012/054228
§ 371 (c)(1),
(2), (4) Date: Oct. 9, 2013

(87) PCT Pub. No.: WO2012/115133
PCT Pub. Date: Aug. 30, 2012

(65) Prior Publication Data
US 2014/0023310 A1    Jan. 23, 2014

(30) Foreign Application Priority Data

Feb. 23, 2011 (JP) .................................. 2011-037718
Feb. 23, 2011 (JP) .................................. 2011-037719

(51) Int. Cl.
*G02B 6/26* (2006.01)
*G02F 1/01* (2006.01)
*G02B 6/30* (2006.01)
*G02F 1/03* (2006.01)
*G02F 1/225* (2006.01)
*G02B 6/293* (2006.01)
*G02F 1/21* (2006.01)
*G02B 6/42* (2006.01)

(52) U.S. Cl.
CPC .............. *G02F 1/011* (2013.01); *G02B 6/2935* (2013.01); *G02B 6/29352* (2013.01); *G02B 6/30* (2013.01); *G02F 1/0123* (2013.01); *G02F 1/0311* (2013.01); *G02F 1/225* (2013.01); *G02F 2001/212* (2013.01); *G02B 6/4214* (2013.01)
USPC ..................... 385/46; 385/31; 385/45; 385/47

(58) Field of Classification Search
CPC .................................................... G02B 6/2935
USPC ................................................ 385/31, 45–47
See application file for complete search history.

(56) References Cited

U.S. PATENT DOCUMENTS 4,747,654 A  *  5/1988  Yi-Yan ............................ 385/37
4,846,540 A  *  7/1989  Kapon ............................ 385/45

(Continued)

FOREIGN PATENT DOCUMENTS

| EP | 1 818 712 A1 | 8/2007 |
|---|---|---|
| JP | 5-53086 A | 3/1993 |
| JP | 5-66334 A | 3/1993 |
| JP | 2001-281507 A | 10/2001 |
| JP | 2006-301612 A | 11/2006 |
| JP | 2009-244812 | 10/2009 |
| WO | 2005/124438 A1 | 12/2005 |

*Primary Examiner* — Charlie Peng
(74) *Attorney, Agent, or Firm* — Taft Stettinius & Hollister LLP

(57) ABSTRACT

An optical modulator is provided which can compensate for a bias shift between an output light and a monitoring light of the optical modulator and which has a configuration capable of being reduced in size with a simple structure. The optical modulator comprises a substrate that has an electro-optical effect, an optical waveguide that includes a Mach-Zehnder type optical waveguide formed in the substrate, a modulation electrode that modulates light waves propagating in the optical waveguide, an optical fiber that guides an output light from the optical waveguide, light collecting means for collecting two radiated lights from the Mach-Zehnder type optical waveguide toward a single optical receiving element, and light intensity ratio adjusting means for adjusting a light intensity ratio of the two radiated lights received by the optical receiving element.

20 Claims, 5 Drawing Sheets

(56) References Cited

U.S. PATENT DOCUMENTS

| | | | |
|---|---|---|---|
| 5,627,929 A * | 5/1997 | Vawter et al. | 385/45 |
| 6,240,118 B1 * | 5/2001 | Doerr et al. | 372/64 |
| 7,689,066 B2 * | 3/2010 | Kondo et al. | 385/3 |
| 7,773,833 B2 * | 8/2010 | Higuma et al. | 385/3 |
| 2003/0147591 A1 * | 8/2003 | Doi et al. | 385/39 |
| 2008/0002926 A1 | 1/2008 | Kondou et al. | |
| 2008/0044123 A1 | 2/2008 | Kawano et al. | |
| 2009/0129719 A1 | 5/2009 | Rowinski et al. | |
| 2011/0158576 A1 * | 6/2011 | Kissa et al. | 385/3 |

* cited by examiner

OPTICAL MODULATOR

TECHNICAL FIELD

The present invention relates to an optical modulator, and more particularly, to an optical modulator having a configuration in which radiated lights from a Mach-Zehnder type optical waveguide are detected using an optical receiving element.

BACKGROUND ART

In the fields of optical communications or optical measurements, optical modulators such as intensity modulators having a Mach-Zehnder type optical waveguide are widely used. The Mach-Zehnder type optical waveguide has a configuration in which an input waveguide is branched into two branch waveguides and the two branch waveguides are merged into an output waveguide. Depending on the types of optical modulators, there are various types of Mach-Zehnder type optical waveguides such as a type using a single Mach-Zehnder type optical waveguide and a type in which another Mach-Zehnder type optical waveguide is assembled into each branch waveguide of a single Mach-Zehnder type optical waveguide in a nest shape.

When light waves propagating in the branch waveguides of the Mach-Zehnder type optical waveguide merge in in-phase in a merging portion, light waves output to an output waveguide are in an ON state. When the light waves merge in out-phase, the light waves are radiated into a substrate in which the optical waveguide is formed or are introduced into radiated-light waveguides disposed to interpose the output waveguide therebetween and the output of the output waveguide is in an OFF state. Hereinafter, an light wave output from the output waveguide in the ON state is referred to as an ON light and an light wave radiated from the merging portion in the OFF state is referred to as an OFF light or a radiated light.

Since the intensity variation of a light output from the Mach-Zehnder type optical waveguide exhibits sinusoidal characteristics, a modulation signal to be applied to a modulation electrode for modulating an optical waveguide propagating in the Mach-Zehnder type optical waveguide needs to be set to an appropriate operation bias point so as to obtain the light intensity of an output light depending on the application of the optical modulator.

Accordingly, in the related art, a part of an output light (ON light) derived to an optical fiber connected to the optical modulator or an OFF light is detected as a monitoring light by an optical receiving element such as an optical detector and the intensity state of the output light of the optical modulator is monitored. The operation bias point of the modulation signal to be applied to the modulation electrode is adjusted (bias-controlled) on the basis of the value (monitoring output) detected by the optical receiving element.

Even when the bias control is performed using the monitoring output as described above, there is a need that an output function of an optical fiber output and a monitoring output of the optical modulator should have a proportional or a complementary relationship with respect to the voltage applied to the modulation electrode and there should not be a bias shift therebetween, in order to optimize the output of the optical modulator. Accordingly, a structure for preventing unnecessary lights from being mixed into the monitoring light or a structure using two OFF lights has been proposed.

In the control of optical communications according to the related art, even when slight bias point misalignment occurs in the monitor output, it does not cause any particular problem. This is because the optical level detected as a signal is the maximum transmission or minimum transmission level of the output function of the intensity modulator having the Mach-Zehnder type optical waveguide. In this case, since the waveform is shaped on the basis of nonlinearity of the output function, several percent of bias shift is allowable.

On the contrary, with the recent increase in communication capacity, when a multi-level modulation format such as a differential quadrature phase shift keying (DQPSK) format is used, for example, it is necessary to set the bias point so that the quadrature point of the output function is the output light level. In this case, since the bias point is set to a point sensitive to the variation in light intensity, it is necessary to precisely control the operation bias point of the optical modulator, for example, with an accuracy of 1% or less of a half-wavelength voltage $V\pi$ so as to keep the quality of the output signal good.

In a Y branch structure of the merging portion as the structure of the Mach-Zehnder type optical waveguide, when light waves are input in in-phase to the merging portion from two branch waveguides, most of the light waves are changed to a fundamental-mode light of the output waveguide and are output as the ON light. However, some of the light waves are radiated as a conversion loss proportionally as the ON light to both sides of the output waveguide.

When light waves are input in out-phase to the merging portion from the two branch waveguides, the output waveguide is designed to guide only the fundamental-mode light and thus lights having different phases (out-phase) are radiated as the off lights to both sides of the output waveguide. As a result, since some of the lights (varying in the same phase as the ON light) as the conversion loss in addition to the OFF lights (out-phase) are mixed, two radiated lights are not in out-phase but have a bias shift departing from the complementary state.

Accordingly, in a configuration for detecting only one radiated light as a monitoring light as described in Japanese Laid-open Patent Publication No. 2001-281507, since a state departing from the regular phase of the OFF light is detected, it is difficult to accurately adjust the bias to the quadrature point.

When a thin-plate structure with a thickness of 20 μm or less is used to enhance the performance of the optical modulator, it is necessary to dispose a radiated-light waveguide in the merging portion as described in Japanese Laid-open Patent Publication No. 2010-237376. In this case, since unnecessary lights do not diffuse but propagate in the substrate due to the thin-plate substrate having characteristics of slab waveguide, various unnecessary lights are likely to be mixed into the monitoring output and a bias shift is likely to occur between the main output which is the output of the optical modulator and the monitoring output.

As described in U.S. Pat. No. 6,795,620, it has been proposed to improve monitoring characteristics by using two radiated lights radiated to both sides of the output waveguide as monitoring lights. In this case, since the departure in phase difference between the radiated lights causes different signs between the monitoring outputs, the departure can be corrected using both radiated lights.

However, as described in U.S. Pat. No. 6,795,620, it is necessary to use an optical detector with a large optical receiving surface or two optical detectors in order to obtain a monitoring output. In the former, the optical detector with a large optical receiving diameter causes an increase in component size. In addition, there is a problem in that the fast frequency responsiveness of the monitoring output degrades.

In the latter, the number of components increases and thus the structure or the connection is complicated, thereby causing an increase in size or an increase in cost.

CITATION LIST

Patent Literature

PATENT LITERATURE 1: Japanese Laid-open Patent Publication No. 2001-281507
PATENT LITERATURE 2: Japanese Laid-open Patent Publication No. 2010-237376
PATENT LITERATURE 3: U.S. Pat. No. 6,795,620
PATENT LITERATURE 4: Japanese Laid-open Patent Publication No. H11-44867

SUMMARY OF INVENTION

Technical Problem

The present invention is made to solve the above-mentioned problems and an object thereof is to provide an optical modulator which can compensate for a bias shift between an output light and a monitoring light of the optical modulator and which has a configuration capable of being reduced in size with a simple structure.

Solution to Problem

According to a first aspect of the present invention, there is provided an optical modulator comprising: a substrate that has an electro-optical effect; an optical waveguide that includes a Mach-Zehnder type optical waveguide formed in the substrate; a modulation electrode that modulates light waves propagating in the optical waveguide; an optical fiber that guides an output light from the optical waveguide; light collecting means for collecting two radiated lights from the Mach-Zehnder type optical waveguide toward a single optical receiving element; and light intensity ratio adjusting means for adjusting a light intensity ratio of the two radiated lights received by the optical receiving element.

A second aspect of the present invention provides the optical modulator according to the first aspect, wherein the light collecting means is reflection means that is disposed in a reinforcing capillary used to connect the optical fiber to an end of the substrate.

A third aspect of the present invention provides the optical modulator according to the first aspect, wherein the light collecting means is constructed using at least one of a lens, a minor, or an optical fiber.

A fourth aspect of the present invention provides the optical modulator according to any one of the first to third aspects, wherein the light intensity ratio adjusting means is means for adjusting an arrangement position of the optical receiving element.

A fifth aspect of the present invention provides the optical modulator according to the fourth aspect, wherein the two radiated lights intersect each other by use of the light collecting means and the optical receiving element is arranged at a position departing from an intersection of the two radiated lights.

A sixth aspect of the present invention provides the optical modulator according to the fifth aspect, wherein the optical receiving element is arranged at a position at which an optical path gap between the two radiated lights is 0.5 times to two times the optical receiving diameter of the optical receiving element.

A seventh aspect of the present invention provides the optical modulator according to any one of the first to third aspects, wherein the light intensity ratio adjusting means is a lights intensity adjusting filter.

An eighth aspect of the present invention provides the optical modulator according to any one of the first to seventh aspects, wherein radiated-light waveguides in which the radiated lights propagate are formed in the substrate.

A ninth aspect of the present invention provides the optical modulator according to any one of the first to eighth aspects, wherein a thickness of the substrate is 20 μm or less.

Advantageous Effects of Invention

According to the first aspect, since the optical modulator comprises a substrate that has an electro-optical effect, an optical waveguide that includes a Mach-Zehnder type optical waveguide formed in the substrate, a modulation electrode that modulates light waves propagating in the optical waveguide, an optical fiber that guides an output light from the optical waveguide, light collecting means for collecting two radiated lights from the Mach-Zehnder type optical waveguide toward an optical receiving element, and light intensity ratio adjusting means for adjusting a light intensity ratio of the two radiated lights received by the optical receiving element, it is possible to simultaneously receive two radiated lights using a single optical receiving element with a small optical receiving diameter. In addition, the two radiated lights have characteristics such that the intensity variations of the two radiated lights are complementary with respect to the intensity variation of the output light of the optical modulator and are deviated to plus and minus each other. The light intensities of the two radiated lights are added to compensate for the output characteristics by the simultaneous reception of the two radiated lights. That is, since the variation in electrical signal output from the optical receiving element is complementary with respect to the intensity variation of the output light propagating in the optical fiber, it is possible to easily obtain a monitoring light (monitoring output) that is shifted to opposite sign with respect to the output light (emitted light) of the optical modulator.

According to the second aspect, since the light collecting means is reflection means that is disposed in a reinforcing capillary used to connect the optical fiber to an end of the substrate, the increase in the number of components is suppressed and it is possible to facilitate the assembly work at the time of manufacturing and to achieve a decrease in cost.

According to the third aspect, since the light collecting means is constructed using at least one of a lens, a minor, or an optical fiber, it is possible to form various light collecting means.

According to the fourth aspect, since the light intensity ratio adjusting means is means for adjusting an arrangement position of the optical receiving element, it is possible to easily adjust the light intensity ratio of the two radiated lights by positioning the optical receiving element.

According to the fifth aspect, since the two radiated lights intersect each other by use of the light collecting means and the optical receiving element is arranged at a position departing from an intersection of the two radiated lights, it is possible to easily adjust the light intensity ratio (the ratio of light intensity) of two radiated lights incident on the optical receiving element by only adjusting the position of the optical receiving element and it is also possible to compensate for the monitoring output detected by the optical receiving element into an appropriate bias shift.

According to the sixth aspect, since the optical receiving element is arranged at a position at which an optical path gap between the two radiated lights is 0.5 times to two times the optical receiving diameter of the optical receiving element, it is possible to compensate for the monitoring output detected by the optical receiving element into an appropriate bias shift by only moving the optical receiving element in a plane perpendicular to the propagation direction of the radiated lights, thereby obtaining high optical receiving sensitivity and reducing a variation in optical receiving sensitivity.

According to the seventh aspect, since the light intensity ratio adjusting means is a light intensity adjusting filter, it is possible to easily adjust the light intensity ratio by arranging the light intensity adjusting filter on at least one side of the two radiated lights.

According to the eighth aspect, since radiated-light waveguides in which the radiated lights propagate are formed in the substrate, it is possible to adjust the position and the direction at and in which the radiated lights are radiated from the substrate and it is thus possible to easily guide the two radiated lights to appropriate positions.

According to the ninth aspect, since a thickness of the substrate is 20 μm or less, it is possible to obtain an accurate monitoring light using the two radiated lights even in a state where a lot of unnecessary lights are confined in the thin-plate substrate.

DESCRIPTION OF EMBODIMENTS

Hereinafter, the present invention will be described in detail using suitable examples.

Figure 1:
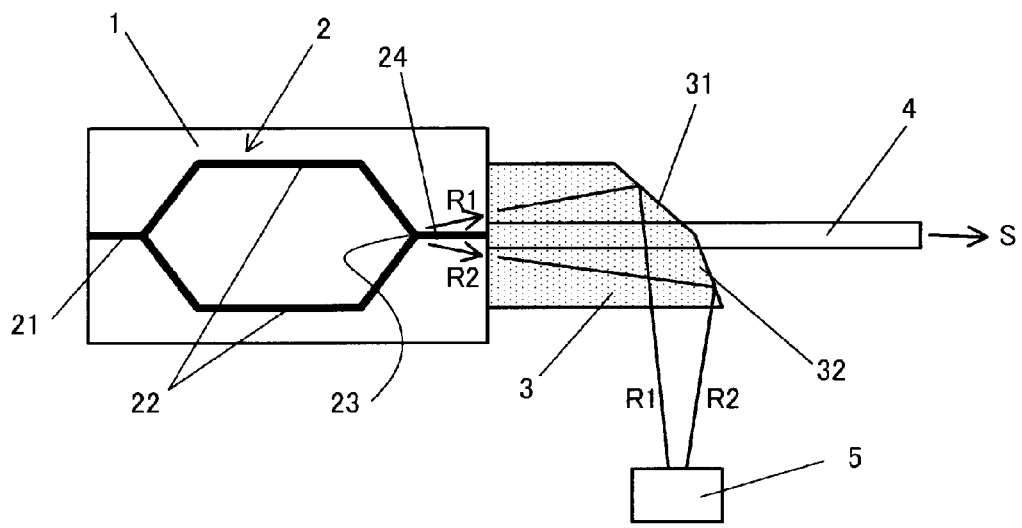
FIG. 1 is a diagram illustrating an optical modulator according to a first embodiment of the present invention.

FIG. 1 is a diagram illustrating an optical modulator according to a first embodiment of the present invention.

An optical modulator according to the present invention comprises a substrate 1 that has an electro-optical effect, an optical waveguide 2 that includes a Mach-Zehnder type optical waveguide (21 to 24) formed in the substrate, a modulation electrode (not shown in the drawing) that modulates light waves propagating in the optical waveguide, an optical fiber 4 that guides an output light from the optical waveguide, light collecting means (31, 32) for collecting two radiated lights (R1 and R2) from the Mach-Zehnder type optical waveguide toward a single optical receiving element 5, and light intensity ratio adjusting means for adjusting a light intensity ratio of the two radiated lights received by the optical receiving element 5.

As shown in FIG. 1, reflection means (31, 32) disposed in a reinforcing capillary 3 for connecting the optical fiber 4 to an end of the substrate 1 can be used as the light collecting means in the optical modulator according to the present invention. For example, by changing a cutting angle of the end of the reinforcing capillary 3 as shown in FIG. 1, two radiated lights (R1 and R2) generated from a merging portion 23 can be received by the single optical receiving element 5 with a small optical receiving diameter. Accordingly, it is possible to compensate for a bias shift between a monitoring light and an optical fiber output light S and thus to obtain an excellent monitoring characteristic.

Figure 2:
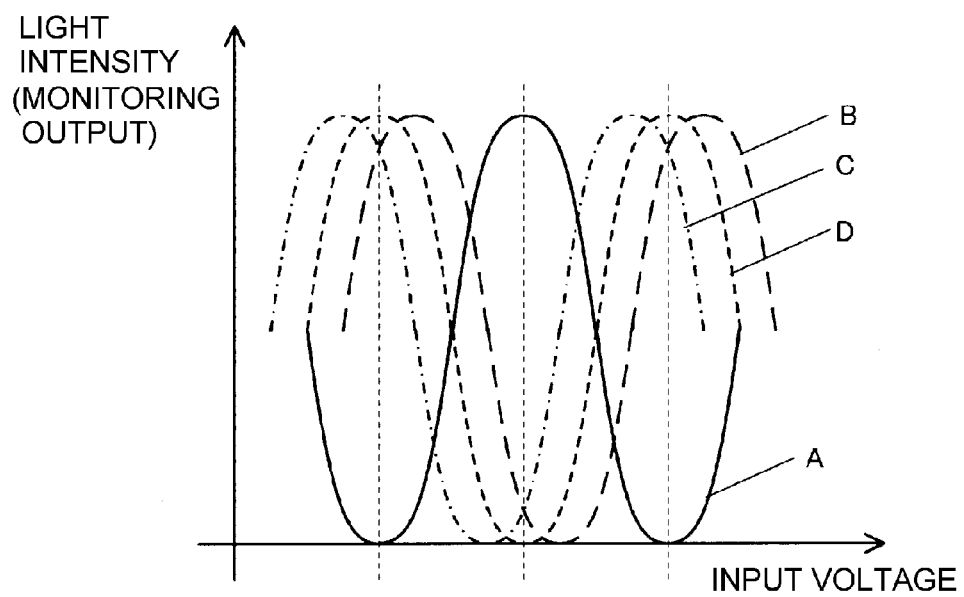
FIG. 2 is a diagram illustrating a relationship between an output light and radiated lights in the optical modulator according to the present invention.

Specifically, the light intensity of the output light S of the optical fiber is indicated by Graph A in FIG. 2. The horizontal axis of the graph represents a bias voltage (input voltage) applied to the modulation electrode. The light intensities of the two radiated lights (R1 and R2) are indicated by Graphs B and C, respectively. In general, the light intensities of the radiated lights including only OFF lights vary complementally with respect to the output light and the electric field amplitudes of the two radiated lights are reverse each other. When some lights (in an in-phase state with respect to the ON light) functioning as a conversion loss in the ON light is mixed into the two radiated lights, the light intensities of the two radiated lights (R1 and R2) depart in the opposite directions as indicated by Graphs B and C in FIG. 2, thereby causing a bias shift (a state in which the phase difference therebetween is not 0 when the two radiated lights reach the optical receiving element). When the radiated lights B and C are simultaneously received, the influence of some lights as the conversion loss is cancelled and Graph D can be obtained as the monitoring output. In this way, the output characteristics of the radiated lights can be corrected to obtain the monitoring output without a bias shift with respect to the output light output from the optical fiber. That is, the monitoring output D has a complementary state with respect to the output light A. The heights of the graphs are standardized.

Actually, the light intensity distributions are not equal to each other when the radiated lights R1 and R2 in FIG. 1 reach the optical receiving element. This means that the amplitude values of Graphs B and C in FIG. 2 are different from each other. Accordingly, even when both lights are incident on the single optical receiving element and the light intensity variations are added simply, the output of Graph D cannot be obtained. In the present invention, the light intensity ratio adjusting means for adjusting the light intensity ratio of two radiated lights received by the optical receiving element is provided.

Figure 3:
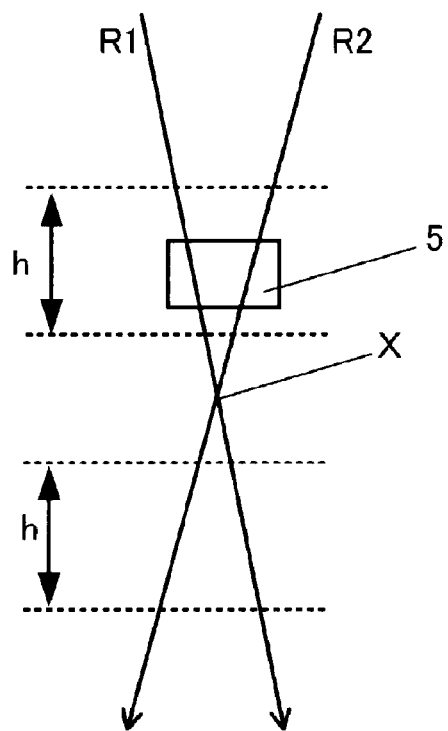
FIG. 3 is a diagram illustrating a position relationship between propagation directions of the radiated lights and an optical receiving element in the optical modulator according to the present invention.

The light intensity ratio adjusting means can be constructed as means for adjusting the arrangement position of the optical receiving element. For example, as shown in FIG. 3, the propagation directions of the two radiated lights R1 and R2 are set to intersect each other and the optical receiving surface of the optical receiving element 5 is adjusted to be arranged in a predetermined range h avoiding an intersection X. The "intersection" is not limited to a case where the propagation directions of the radiated lights are flush with each other, but a part in which both radiated lights get close to each other has only to be present even in a skewed position relationship.

Figure 4:
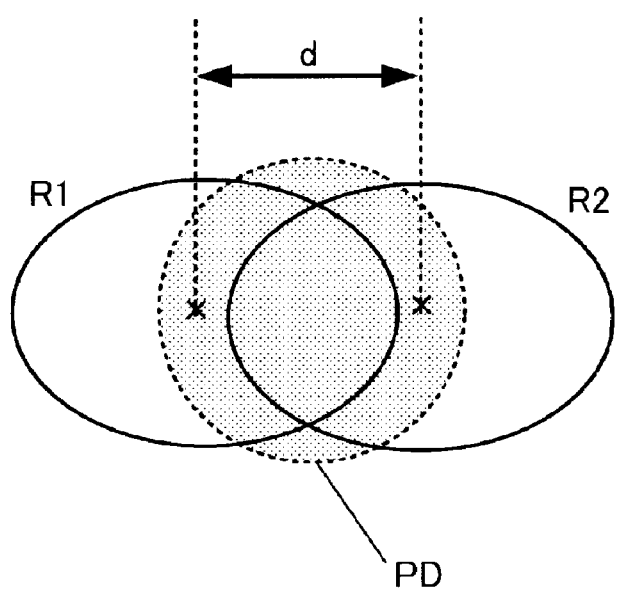
FIG. 4 is a diagram illustrating a relationship between cross-sections of the radiated lights and the optical receiving diameter of the optical receiving element in the optical modulator according to the present invention.

The optical receiving element 5 can be arranged by adjusting the position thereof in the vertical direction and the horizontal direction in FIG. 3. Accordingly, as shown in FIG. 4, the position of the optical receiving surface PD can be changed relative to the beam shape of the radiated light R1 and the beam shape of the radiated light R2, thereby changing the light intensities of the radiated lights (R1 and R2) incident on the optical receiving element.

It is preferable that the optical receiving element 5 be arranged at a position at which the optical path gap d (the peak gap between the light intensity distributions) of the two radiated lights R1 and R2 is 0.5 times to two times the optical receiving diameter (the diameter of the optical receiving surface PD) of the optical receiving element. When the optical path gap is smaller than 0.5 times, the light intensity ratio of the received radiated lights cannot be greatly changed even by moving the optical receiving element in the horizontal direction in FIG. 3 or 4. When the optical path gap is larger than two times, it is difficult to simultaneously and efficiently receive both radiated lights by the use of the single optical receiving element.

The optical receiving surface is not limited to a circular shape, but may be a rectangular shape. In this case, the "optical receiving diameter" corresponds to the length in the direction of arrow d when the optical receiving surface PD of FIG. 4 is rectangular.

The parts of the ranges h in FIG. 3 represent a range in which the optical path gap d of the two radiated lights (R1 and R2) is 0.5 times to two times the optical receiving diameter of the optical receiving element. The ranges h are located at positions departing from the intersection X at which the two radiated lights intersect each other. By arranging the optical receiving element at the position departing from the intersection X, it is possible to adjust the received light intensity ratio of the two monitoring lights while suppressing the variation in sensitivity due to the positional departure to the minimum and to adjust the bias shift of the monitoring output.

The reflection means disposed in the reinforcing capillary 3 may be planar as shown in FIG. 1 or may be curved. By configuring the reflection means to totally reflect the radiated lights, it is possible to efficiently direct the radiated lights toward the optical receiving element. The total reflection means can be realized by setting the end face angle of the capillary so that the relationship between the optical axes of the radiated lights and the reflecting surface or forming a mirror on the reflecting surface of the capillary using metal or the like.

In the optical modulator shown in FIG. 1, the monitoring output having a small variation in sensitivity and having a bias shift of 0 can be obtained by disposing the optical receiving element 5 at a position at which the optical axes of the monitoring lights have a gap similar to the optical receiving diameter of the optical receiving element. In addition, since the optical power input to the optical receiving element increases in comparison with the case where one of radiated lights is received in the related art, it is possible to enhance the sensitivity of the optical receiving element for monitoring. Since an optical receiving element with a small optical receiving diameter can be used, it is possible to obtain a monitoring output having an excellent frequency response. For example, by setting the optical receiving diameter to 100 μm or less, fast response characteristics of the monitoring lights of about several hundred MHz to several GHz can be realized.

Figure 5:
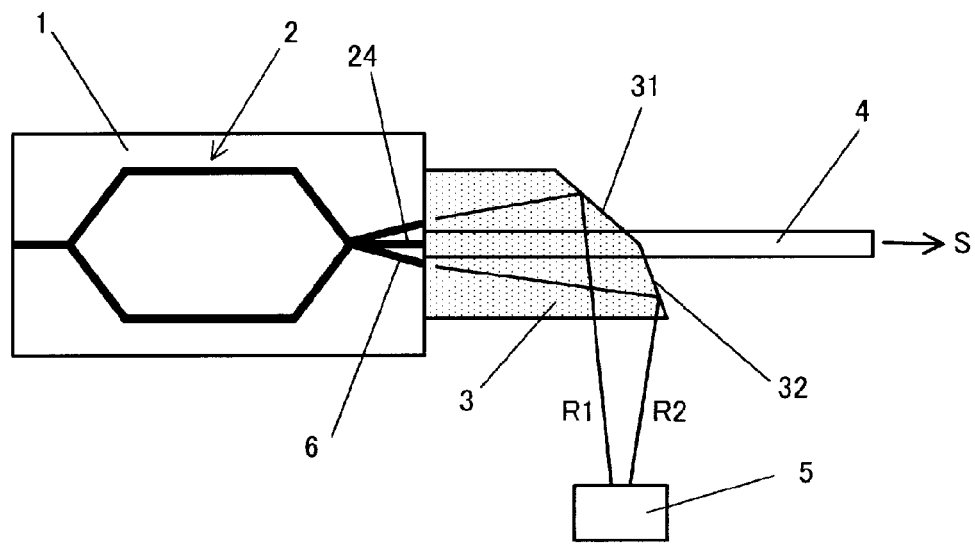
FIG. 5 is a diagram illustrating an optical modulator according to a second embodiment of the present invention.

As shown in FIG. 5, it is preferable that radiated-light waveguides 6 be disposed to interpose the output waveguide 24 therebetween, for guiding the radiated lights radiated from the merging portion of the Mach-Zehnder type optical waveguide. Particularly, when a thin-plate substrate with a thickness of 20 μm or less is used, it is possible to efficiently separate the radiated lights from the output light by disposing the radiated-light waveguides.

In addition, by adjusting the shapes of the radiated-light waveguide 6, it is possible to adjust the position and direction at and in which the radiated lights (R1 and R2) are radiated to the reinforcing capillary 3 and it is thus possible to easily guide the two radiated lights to appropriate positions in cooperation with the reflection means (31, 32) of the reinforcing capillary.

Figure 6:
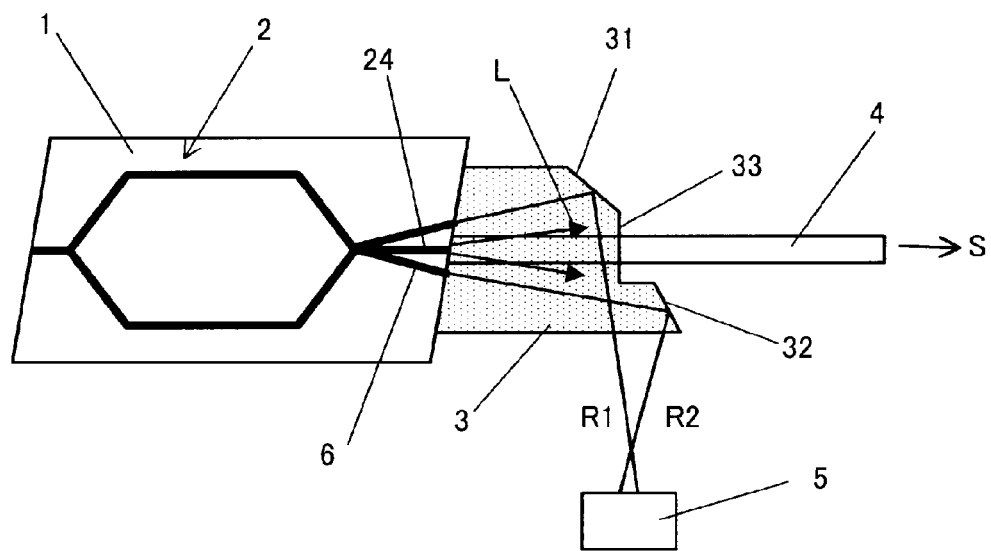
FIG. 6 is a diagram illustrating an optical modulator according to a third embodiment of the present invention.

As shown in FIG. 6, a cutout 33 may be formed in the central portion of the reinforcing capillary. According to this configuration, it is possible to suppress incidence of a decoupling light L of the optical fiber, which is radiated from a connecting portion of the output waveguide 24 and the optical fiber 4 in the substrate, on the optical receiving element and thus to suppress degradation of an extinction ratio of the monitoring output.

As shown in FIG. 6, by bonding the substrate and the optical fiber or the reinforcing capillary to each other at an inclination angle satisfying Snell's law, it is possible to suppress backward movement of light waves by total reflection on the bonding surface.

In the optical modulator according to the present invention, the light intensity ratio of the radiated lights to be received can be easily adjusted depending on the position of the optical receiving element by disposing the optical receiving element before or after the intersection of the propagation directions of the radiated lights as shown in FIG. 3. Accordingly, it is possible to obtain an optical modulator having the optimal bias shift even when there is a manufacturing error.

Figure 7:
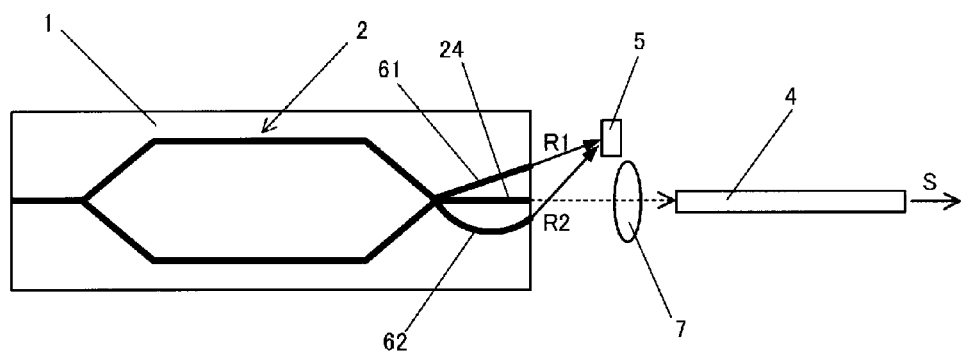
FIG. 7 is a diagram illustrating an optical modulator according to a fourth embodiment of the present invention.
Figure 8:
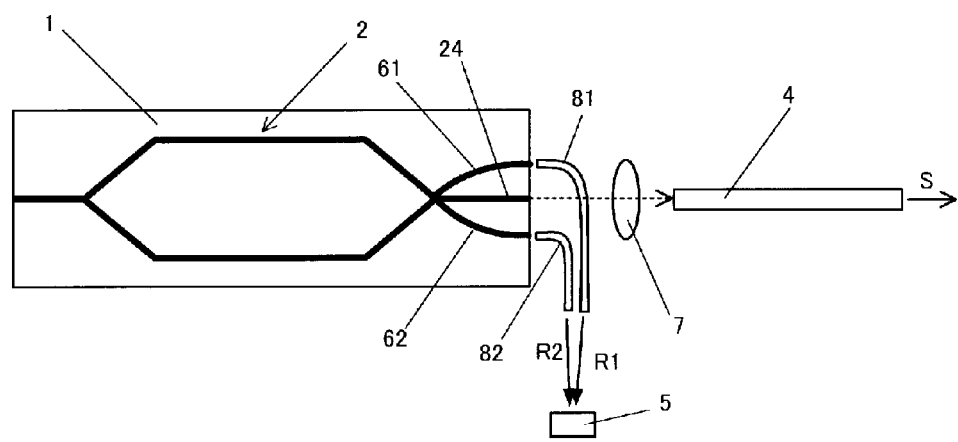
FIG. 8 is a diagram illustrating an optical modulator according to a fifth embodiment of the present invention.

The optical modulator and the optical fiber may be optically connected to each other in a free space optics using a condensing lens without using the reinforcing capillary, as described in Japanese Laid-open Patent Publication No. H11-44867. In this optical system, as shown in FIG. 7 or 8, radiated-light waveguides (61 and 62) formed in the substrate 1 so as to guide the radiated lights may be used as the light collecting means of the two radiated lights. The light collecting means may be realized by adjusting the shape of the radiated-light waveguides so as to direct the radiated lights (R1 and R2) radiated from the radiated-bean waveguides (61 and 62) to the optical receiving element 5. Reference numeral 7 in FIG. 7 represents a condensing lens for guiding the output light (emitted light) S from the optical modulator to the optical fiber 4.

Optical fibers (81 and 82) guiding the radiated lights may be disposed as shown in FIG. 8 so as to guide the radiated lights (R1 and R2) to the optical receiving element 5. A lens or a minor may be used instead of the optical fibers (81 and 82).

Figure 9:
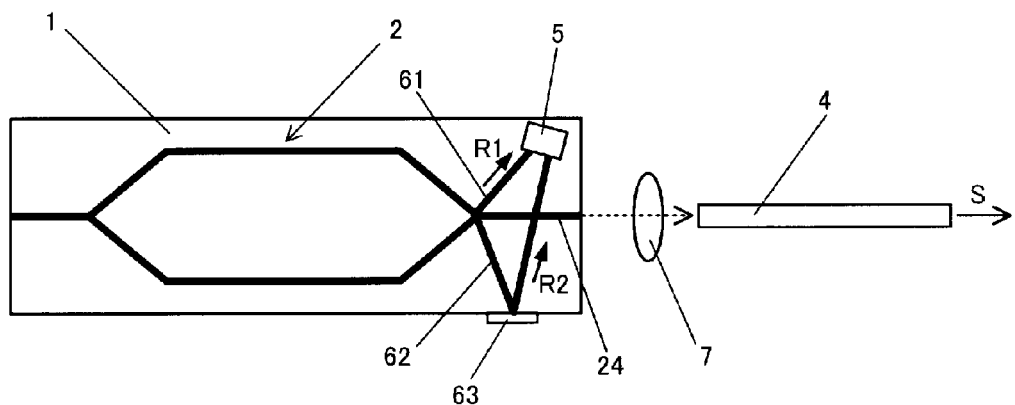
FIG. 9 is a diagram illustrating an optical modulator according to a sixth embodiment of the present invention.

As shown in FIG. 9, the radiated-light waveguide 62 may be bent on the side surface of the substrate and reflection means 63 such as a reflecting coating may be disposed on the side surface, thereby causing the two radiated lights (R1 and R2) to intersect each other on the substrate 1. By disposing the optical receiving element 5 to be in contact with or in the vicinity of the radiated-light waveguide of the substrate 1, it is possible to receive two radiated lights propagating in the waveguides. By adjusting the position of the optical receiving element 5 relative to the radiated-light waveguides, it is possible to adjust the light intensity ratio of the two radiated lights received by the optical receiving element.

Figure 10:
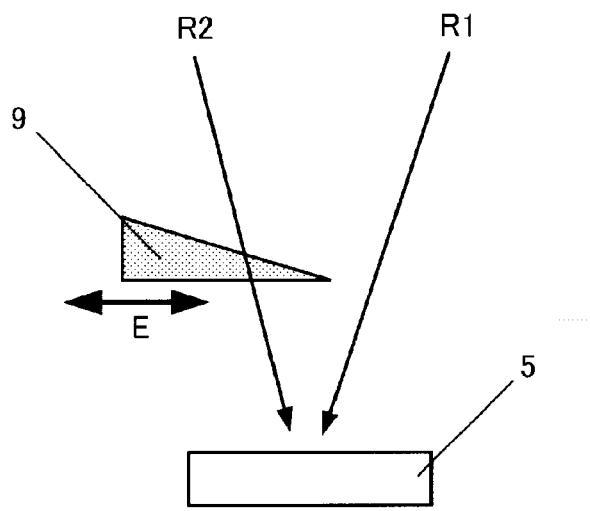
FIG. 10 is a diagram illustrating an example of a light intensity adjusting filter used in the optical modulator according to the present invention.

In the optical modulator according to the present invention, a light intensity adjusting filter 9 as shown in FIG. 10 may be used instead of the position adjusting means of the optical receiving element as the light intensity ratio adjusting means. The light intensity ratio of two radiated lights incident on the optical receiving element 5 is adjusted by inserting the light intensity adjusting filter 9 into the optical path of at least one radiated light. By constructing the filter 9 so that the light transmittance there of varies depending on the insertion, it may be also possible to adjust the light intensity to more various levels.

Industrial Applicability

As described above, by employing the optical modulator according to the present invention, it is possible to provide an optical modulator which can compensate for a bias shift between an output light and a monitoring light in the optical modulator and which can be reduced in size with a simple structure.

Reference Signs List
1 SUBSTRATE HAVING AN ELECTRO-OPTICAL EFFECT
2 OPTICAL WAVEGUIDE
21 INPUT WAVEGUIDE
22 BRANCH WAVEGUIDE
23 MERGING PORTION
24 OUTPUT WAVEGUIDE
3 REINFORCING CAPILLARY
31, 32 REFLECTION MEANS
33 CUTOUT
4 OPTICAL FIBER
5 OPTICAL RECEIVING ELEMENT
6 RADIATED-LIGHT WAVEGUIDE
R1, R2 RADIATED LIGHT (OFF LIGHT, etc.)

The invention claimed is:

1. An optical modulator comprising:
a substrate that has an electro-optical effect;
an optical waveguide that includes a Mach-Zehnder type optical waveguide formed in the substrate;
a modulation electrode that modulates light waves propagating in the optical waveguide;
an optical fiber that guides an output light from the optical waveguide;
light collecting means for collecting two radiated lights from the Mach-Zehnder type optical waveguide toward a single optical receiving element; and
light intensity ratio adjusting means for adjusting a light intensity ratio of the two radiated lights received by the optical receiving element.

2. The optical modulator according to claim 1, wherein the light collecting means is a reflection means that is disposed in a reinforcing capillary used to connect the optical fiber to an end of the substrate.

3. The optical modulator according to claim 1, wherein the light collecting means is constructed using at least one of a lens, a mirror, and an optical fiber.

4. The optical modulator according to claim 1, wherein the light intensity ratio adjusting means is a means for adjusting an arrangement position of the optical receiving element.

5. The optical modulator according to claim 4, wherein the two radiated lights intersect each other by use of the light collecting means and the optical receiving element is arranged at a position departing from an intersection of the two radiated lights.

6. The optical modulator according to claim 5, wherein the optical receiving element is arranged at a position at which an optical path gap between the two radiated lights is 0.5 times to two times the optical receiving diameter of the optical receiving element.

7. The optical modulator according to claim 1, wherein the light intensity ratio adjusting means is a light intensity adjusting filter.

8. The optical modulator according to claim 1, wherein radiated-light waveguides in which the radiated lights propagate are formed in the substrate.

9. The optical modulator according to claim 1, wherein a thickness of the substrate is 20 μm or less.

10. The optical modulator according to claim 2, wherein the light intensity ratio adjusting means is a means for adjusting an arrangement position of the optical receiving element.

11. The optical modulator according to claim 3, wherein the light intensity ratio adjusting means is a means for adjusting an arrangement position of the optical receiving element.

12. The optical modulator according to claim 2, wherein the light intensity ratio adjusting means is a light intensity adjusting filter.

13. The optical modulator according to claim 3, wherein the light intensity ratio adjusting means is a light intensity adjusting filter.

14. The optical modulator according to claim 2, wherein radiated-light waveguides in which the radiated lights propagate are formed in the substrate.

15. The optical modulator according to claim 3, wherein radiated-light waveguides in which the radiated lights propagate are formed in the substrate.

16. The optical modulator according to claim 4, wherein radiated-light waveguides in which the radiated lights propagate are formed in the substrate.

17. The optical modulator according to claim 5, wherein radiated-light waveguides in which the radiated lights propagate are formed in the substrate.

18. The optical modulator according to claim 6, wherein radiated-light waveguides in which the radiated lights propagate are formed in the substrate.

19. The optical modulator according to claim 7, wherein radiated-light waveguides in which the radiated lights propagate are formed in the substrate.

20. The optical modulator according to claim 2, wherein a thickness of the substrate is 20 μm or less.

* * * * *